United States Patent
Kreiner et al.

(10) Patent No.: US 7,562,162 B2
(45) Date of Patent: Jul. 14, 2009

(54) SYSTEMS AND METHODS FOR DISTRIBUTED COMPUTING UTILIZING A SMART MEMORY APPARATUS

(75) Inventors: Barrett Kreiner, Woodstock, GA (US); Jonathan Reeves, Roswell, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 125 days.

(21) Appl. No.: 11/739,894

(22) Filed: Apr. 25, 2007

(65) Prior Publication Data

US 2008/0270651 A1    Oct. 30, 2008

(51) Int. Cl.
*G06F 3/00* (2006.01)

(52) U.S. Cl. .............................. 710/11; 710/62; 710/72; 710/315; 716/16; 716/17

(58) Field of Classification Search ............... 710/8–14, 710/62–63, 72–74, 305–315; 716/16–17
See application file for complete search history.

(56) References Cited

U.S. PATENT DOCUMENTS

| | | | |
|---|---|---|---|
| 5,615,344 A | 3/1997 | Corder | |
| 5,768,598 A * | 6/1998 | Marisetty et al. | 710/260 |
| 6,073,201 A * | 6/2000 | Jolley et al. | 710/315 |
| 6,553,408 B1 | 4/2003 | Merrell | |
| 6,654,817 B1 | 11/2003 | Huang | |
| 6,763,409 B1 | 7/2004 | Elliott | |
| 6,845,496 B2 * | 1/2005 | Honmura | 716/14 |
| 6,968,419 B1 | 11/2005 | Holman | |
| 6,985,988 B1 | 1/2006 | Nsame | |
| 7,188,276 B2 * | 3/2007 | Yun | 714/28 |
| 7,343,558 B2 * | 3/2008 | Kadota | 715/725 |
| 7,412,588 B2 * | 8/2008 | Georgiou et al. | 712/33 |
| 2002/0062387 A1 | 5/2002 | Yatziv | |
| 2002/0143942 A1 | 10/2002 | Li | |
| 2002/0169521 A1 | 11/2002 | Goodman et al. | |
| 2002/0188718 A1 | 12/2002 | McGraw et al. | |
| 2003/0058274 A1 | 3/2003 | Hill | |
| 2003/0223585 A1 | 12/2003 | Tardo | |
| 2003/0229689 A1 | 12/2003 | Raghavan | |
| 2004/0073727 A1 | 4/2004 | Moran | |
| 2004/0098600 A1 | 5/2004 | Eldeeb | |
| 2004/0117522 A1 | 6/2004 | Loffink | |
| 2004/0123119 A1 | 6/2004 | Buer | |
| 2004/0133894 A1 | 7/2004 | Juszkiewicz et al. | |

(Continued)

OTHER PUBLICATIONS

Gerasimov, T. et al. Design and Implementation of a Block Storage Multi-Protocol Converter. Mass Storage System Systems and Technologies, 2003 (MSST 2003). Proceedings. NASA Goddard Conference on 7-10. pp. 183-188.

(Continued)

*Primary Examiner*—Christopher B Shin
(74) *Attorney, Agent, or Firm*—Withers & Keys, LLC

(57) ABSTRACT

Provided are methods, systems and devices for distributed computing within a computing device that includes a host operating system executing within a host processor, a peripheral subsystem and a host interface. The peripheral subsystem includes a programmable logic device ("PLD") that contains and executes an instruction autonomously from the host operating system and an electronic device coupled to the PLD via a device interface that executes the instruction. The host interface places the host processor in communication with the PLD whereby the host operating system employs the peripheral subsystem.

20 Claims, 7 Drawing Sheets

U.S. PATENT DOCUMENTS

| | | | |
|---|---|---|---|
| 2004/0153848 | A1 | 8/2004 | Cromer |
| 2004/0193791 | A1 | 9/2004 | Felton |
| 2004/0201931 | A1 | 10/2004 | Korcharz |
| 2004/0221070 | A1 | 11/2004 | Ortega |
| 2004/0221123 | A1 | 11/2004 | Lam |
| 2004/0225762 | A1 | 11/2004 | Poo |
| 2005/0015179 | A1 | 1/2005 | Dickey et al. |
| 2005/0021874 | A1* | 1/2005 | Georgiou et al. ............ 709/250 |
| 2005/0066046 | A1 | 3/2005 | Chadalapaka |
| 2005/0172000 | A1 | 8/2005 | Nakamura |
| 2005/0187939 | A1 | 8/2005 | Krithivas |
| 2005/0281254 | A1 | 12/2005 | Harris |
| 2006/0245533 | A1 | 11/2006 | Rostampour |
| 2007/0050106 | A1* | 3/2007 | Chinnadurai ................. 701/29 |
| 2007/0050689 | A1* | 3/2007 | Sasakura .................... 714/718 |
| 2008/0209091 | A1* | 8/2008 | Nadarajah et al. ........... 710/106 |

OTHER PUBLICATIONS

P.H.W. Long et al; "Pilchard - Reconfiguable Computing Platform with Memory Slot Interface"; 2001 IEEE Symposium on Field-Programmable Custom Computing Machines (FCCM).

"Network-Drivers.com" 3Com 3C509 driver - 3Com Network Drivers - 5x9c32.exe; http://www.networks-drivers.com/drivers/155/155121.htm. Jan. 16, 2006.

"Network-Drivers.com" 3Com.65507 driver - 3Com Network Drivers - 65507; http://www.network-drivers.com/companies/2.htm. Jan. 14, 2006.

"PCI on GlobalSpec"; Find PCI/Card/Compact/2.2 PCI Standard/PCI on GlobalSpec; http://pci.globalspec.com/ Jan. 14, 2006.

"It's here. It's real. It's amazing. Mac OS X on Intel." http://apple.com/macosx/ Jan. 14, 2006.

Operating Systems; Sun Software; http://www.sun.com/software/index.jsp?cat=Operating%20Systems&tab=3 Jan. 14, 2006.

Linux Os Download; The linux Home Page at Linux Online; http://www.linux.org Jan. 14, 2006.

U.S. Appl. No. 11/408,766 filed Apr. 21, 2006; Issued as U.S. Patent 7,409,478.

U.S. Appl. No. 10/918,304 filed Aug. 12, 2004; Published as U.S. Appl. No. 2006/0036786.

Kreiner, U.S. Appl. No. 11/840,248, filed Aug. 17, 2007.

EFGT120 EtherFast Network Attached Storage, Linksys, http://Linksys.com/servlet/Satellite?c=L_Product_C2&childpagename=US%2FLayo, dated unknown.

NSLU2 Network Storage for USB 2.0 Disk Drives Easily Add Storage Space To Your Network, Linksys, http://www.linksys.com/servlet/Satellite?c=L_Product_C2&childpagename=US%2FLayo, date unknown.

Network file system, Wikipedia, http://en.wikipedia.org/wiki/Distributed_file_system, last modified Apr. 4, 2007.

Asynchronous Transfer Mode, Wikipedia, http://en.wikipedia.org/wiki/Asynchronous_Transfer_Mode, last modified Apr. 7, 2007.

* cited by examiner

SYSTEMS AND METHODS FOR DISTRIBUTED COMPUTING UTILIZING A SMART MEMORY APPARATUS

TECHNICAL FIELD

The subject matter described herein relates to the field of electronics. More particularly it relates to systems, devices and methods using programmable logic devices to allow distributed computing within a host computing device.

BACKGROUND

The ownership and use of computers is ubiquitous. Most businesses and homes have at least one computer that utilizes one of several operating systems such as Windows®, UNIX®, Apple® or LINUX®. Over time, computers have improved exponentially in memory size, speed and capability as operating systems have become larger and more sophisticated. To increase market appeal, manufacturers have enabled their computers to support a large number of peripheral components in case their customers wish to add one or a few of a myriad of available peripheral devices. Operating system designers have thus incorporated a large number of drivers and other software objects required to operate peripherals that may be superfluous to the computing system as it may be configured by the customer.

Historically, conventional computer design has used the host computer's operating system itself to manage the operation of a computer's disk drives and other peripherals. The management of peripherals is a task that is cumulative to the task of running the user applications which is the primary concern of a user. As a result, today's operating systems have become bloated with unnecessary peripheral drivers, data management instructions and house keeping routines such as disk operation, defragmentation and disk clean-up. Operating systems are also used to manage pagefiles, block files and as a platform used to coordinate antivirus protection. The greater functionality of ever more sophisticated and larger operating systems has required larger memory devices and faster microprocessors which in turn require more electrical power, overly complex mother boards and generate excessive heat.

SUMMARY

It should be appreciated that this Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Provided are exemplary embodiments. The embodiments provide an apparatus in communication with a host operating system that includes a generic interface and a device interface. The host computing device employs the apparatus via the generic interface. The apparatus also includes a programmable logic device ("PLD") that is coupled to the host computing device via the generic interface, the PLD communicating through the generic interface with the host computing device via a first file system protocol. The first file system protocol stores and retrieves data from a peripheral device. The PLD is coupled to the peripheral device via the device interface and communicates with the device interface using a second file system protocol that is foreign to the host computing system to store and retrieve data using the peripheral on behalf of the host computing system.

In accordance with other exemplary embodiments, a method is provided that includes receiving an instruction by a PLD for controlling a peripheral device, where the PLD is in communication with the peripheral device via a device interface and is also in communication with the host computing device via a generic interface. The method further includes the PLD receiving a task request from the host computing device via the generic interface to be accomplished according to the instruction. The task request is augmented with additional instructions provided by a meta-behavior interface. The PLD issues one or more commands to the peripheral device via the device interface in response to the augmented the task request and receives a result from the peripheral device upon the completion of the task. An indication of the result is returned to the host computing device via the generic interface.

Exemplary embodiments also include a computer readable medium containing an auxiliary program within a logic device in communication with a host operating system containing instructions to create a data storage and file system that are foreign to the host operating system with which to store data to and retrieve data from a peripheral device. Additional instructions are included which receive an instruction for controlling the peripheral device wherein the logic device is in communication with the peripheral device via a device interface and in communication with the host computing device via a generic interface and to also receive a task request from the host computing device via the generic interface. The task request is augmented with additional instructions provided by a meta-behavior interface within the auxiliary program. One or more commands are issued to the peripheral device via the device interface in response to the augmented request, a task result is received from the peripheral device upon the completion of the task request and an indication of the task result is returned to the host computing device via the generic interface.

Other apparatuses, methods, and/or systems according to embodiments will be or become apparent to one with skill in the art upon review of the following drawings and Detailed Description. It is intended that all such additional apparatus, systems and/or methods be included within this description, be within the scope of the present invention, and be protected by the accompanying claims.

DETAILED DESCRIPTION

Figure 1:
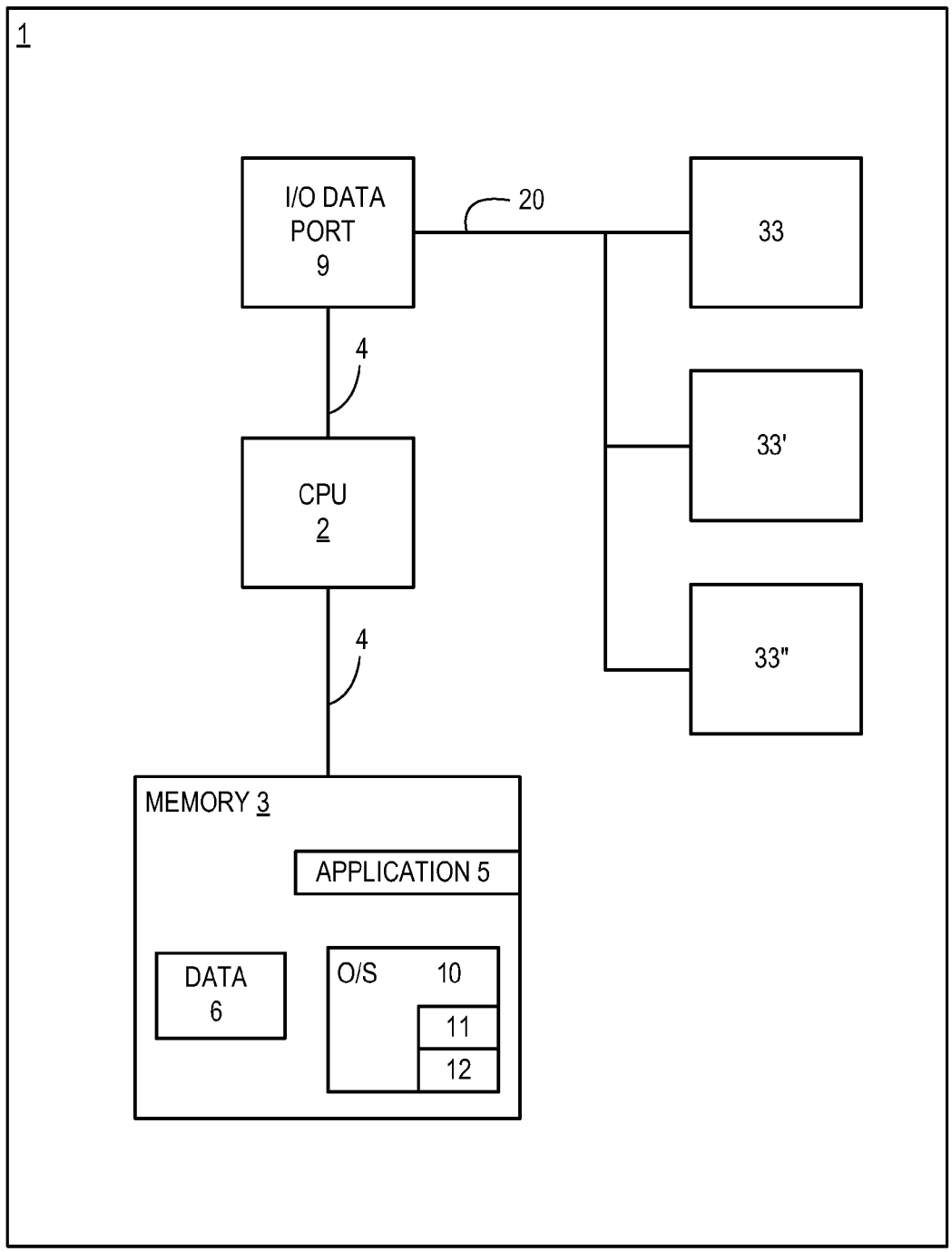
FIG. 1 is an overview illustrating a conventional computer system.

The following disclosure is directed to systems, methods and devices that use a Gate Array Appliance (a "GAA"), a reprogrammable logic device or other type of Programmable Logic Device (a "PLD") to unburden the operating system of a host computing system. The use of a PLD allows the host computing system to communicate with any peripheral subsystem or network device as if the host computing system were communicating with a network file system via a generic high speed serial and/or a network interface. As non-limiting examples, generic interface may be a virtual Ethernet interface or a virtual universal asynchronous receiver-transmitter (UART) interface.

A PLD may unburden the operating system of the host computing system by programming/reprogramming itself or allowing itself to be programmed/reprogrammed with an auxiliary program or and auxiliary operating system that may be explicitly foreign to the host operating system. The term "foreign" is not being used herein as limiting the programming of the PLD to a operating system that is incompatible with the host operating system, per se, but is intended to be more expansive to encompass a mixture of drivers, support software and other instructions that may be unrecognizable and or inoperable by the host operating system other than via the generic interface. However, it is contemplated herein that that the auxiliary operating system my also incorporate files and instructions copied directly for the host operating system as well.

Although foreign to the host operating system, the auxiliary operating system may include programming of similar functionality to portions of the host operating system but be created independently from the host operating system and may be custom to the chipset comprising the PLD or vice versa. Further, the auxiliary operating system may contain software objects that are uniquely generated upon instantiation such that one instantiation of the auxiliary operating system within a PLD is unique to a former or future instantiation of the auxiliary operating system on the same PLD. The auxiliary operating system may include a unique executable language and an appropriately matched executable commands.

The auxiliary operating system may cause itself to be reprogrammed from time to time. Such reprogramming may be triggered by a number of events. Non-limiting examples of such events may include the inability to recognize a task request from the host computer system. Other non-limiting examples of events triggering a reprogramming may also include a planned reprogramming, an inability to execute a task request, recognizing a virus, a hacking attempt or other breach of security.

The auxiliary operating system may comprise a custom file system that is foreign to the host operating system. For example, only the custom filing system resident in the PLD may know the geometry of the memory device which it is controlling. The auxiliary operating system may also include a meta-behavior interface that works in conjunction with standard host operating system file instructions, wherein the meta-behavior interface may modify and augment the host operating system file instructions. The meta-behavior interface mandates behavior concerning the actual handling of a file as opposed to a host operating system attribute/instruction which merely describes or provides a suggestion concerning how an operating system should handle a file, according to exemplary embodiments. As a non-limiting example, a conventional operating system such as Windows XP® from Microsoft Corporation may create a file accompanied by an attribute or an instruction that ostensibly makes the file "read-only". However, such an attribute is not absolute. User applications may override such an attribute from the operating system. A meta-behavior interface may translate the file attribute accompanying the file and reinterpret the attribute as making the read-only status absolute unless again modified by the meta-behavior interface. The auxiliary operating system also may include a meta-behavior interpreter which may be a rules engine that may receive standard host operating system file instructions and may augment those instructions or issue instructions on its own based on inference and historical events.

By off loading the operational burden associated with device specific drivers, support software and other portions of the operating system to the auxiliary operating system located on the remote side of the generic interface, the size, speed, efficiency and resiliency of the host operating system may be significantly enhanced. Such a configuration may replace multiple physical controllers on the host with a single interface. The use of a PLD as described herein may allow the simplification of the design and implementation of the host operating system and may allow additional flexibility by allowing modular, interchangeable configurations. As further advantages, computer motherboards may be miniaturized and computer processor efficiency may be increased as the burden on the host computer processors may be reduced.

The subject matter now will be described more fully below with reference to the attached drawings which are illustrative of various embodiments herein. The attached drawings have been simplified to clarify the understanding of the systems, devices and methods disclosed. The subject matter may be embodied in a variety of forms and the exemplary configurations and descriptions, infra, are provided to more fully convey the scope of the disclosure.

A Field Programmable Gate Array ("FPGA") is a non-limiting example of a PLD that may be used in any embodiments consistent with this disclosure. Other non-limiting examples of PLD's may also include Complex Programmable Logic Devices ("CLPD"), self-organizing single layer, molecular diodes and multi-core DSP circuits. Future innovations improving upon the operation and efficiency of FPGA's specifically and PLD's in general are fully contemplated within the scope of the disclosure herein as being components useful in implementing any embodiments discussed below.

Referring to FIG. 1, each component within a conventional computer 1 and each peripheral attached to the computer has traditionally been controlled by the host computer's operating system 10 using device specific drivers 12 and management software 11 such as defragmentation programs, disk operating systems, network file systems and the like. The operating system 10, file systems 11 and device drivers 12 are usually resident on a memory device 3 and are executed by one or more central processing units ("CPU") 2. The device drivers 12 usually include software objects which are accessed through the operating system 10 by the application programs 5. The device drivers 12 communicate with devices such as the memory devices/peripherals (33, 33', 33") coupled to the computing system 1 through a data port 9. Data 6 and commands issued from the operating system 10 are communicated among the CPU 2, the memory device 3 and the data port 9 via one or more communications buses 4. The operating system 10 may be any operating system suitable for use with the computing system 1. Non-limiting examples of operating systems include AIX or System390 from International Business Machines; Windows95® operating system, Windows98® operating system, Windows2000® or Windows XP® operating system from Microsoft Corporation; Unix; Linux; Mac OS® operating system from Apple Computer, Inc; and/or Solaris operating system from Sun Microsystems.

Because of the centralized processing at the CPU 2 by the operating system 10, data 6 and commands are often double handled as they transfer back and forth between the memory device 3, the CPU 2 and the peripherals (33, 33', 33"). Such repetitive communication over the various buses 4 is inefficient in terms of time, computing overhead and component complexity. Therefore, because of the central processing, increasingly sophisticated software applications require ever increasing CPU speeds. The resulting heat generation in turn self limits the potential speed and computing power of a CPU 2.

Figure 2:
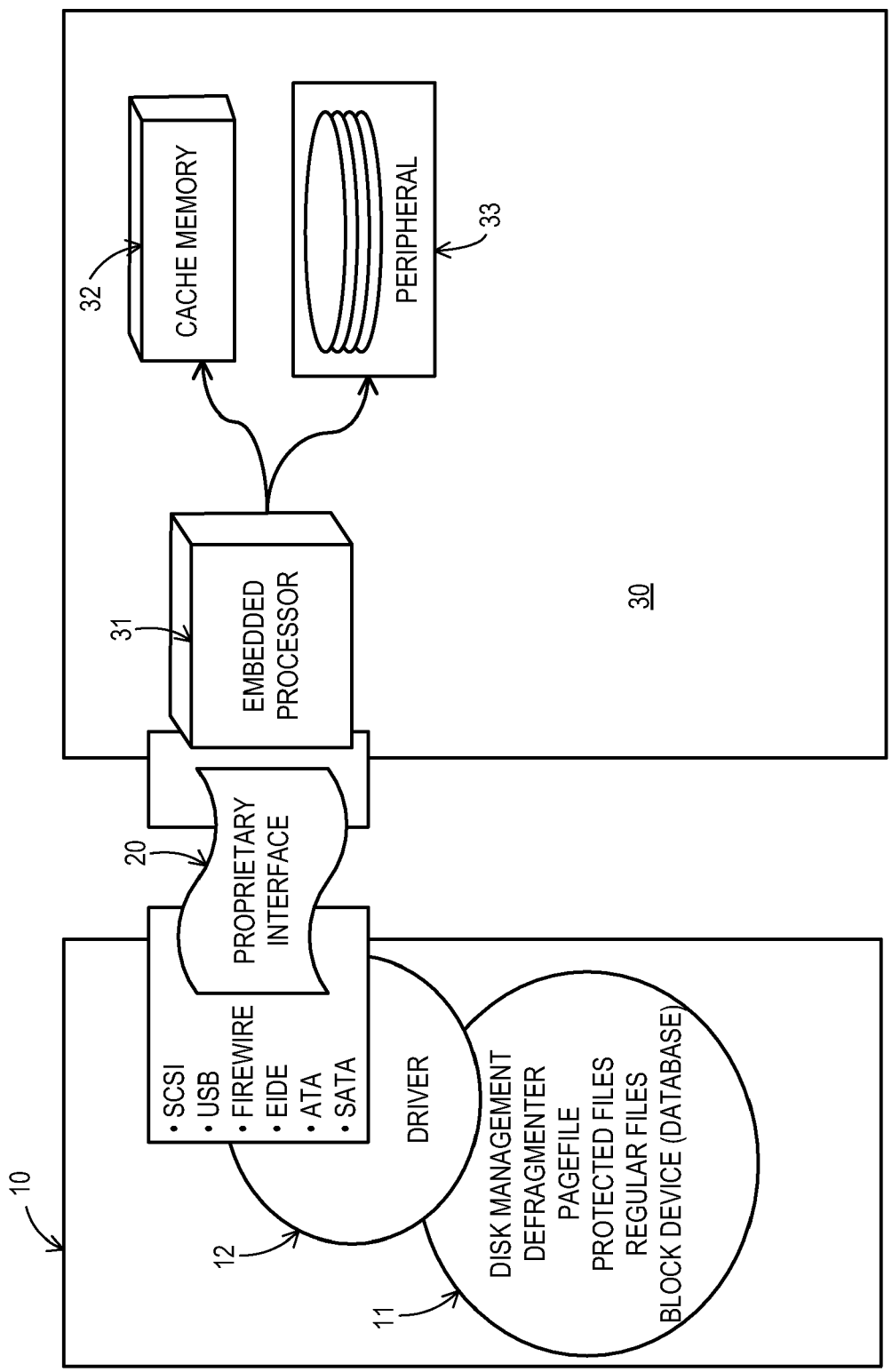
FIG. 2 depicts a conventional peripheral device.

FIG. 2 illustrates integration of a conventional peripheral, such as the peripheral 33, with a host operating system, such as the host operating system 10. The host operating system 10 includes the peripheral driver 12 and the file system 11, including support software for the peripheral 33. The host operating system 10 communicates with a peripheral subsystem 30 via a device specific interface 20 of the peripheral 33. The peripheral's device specific interface 20 exclusively uses one of several current interface standards or may be a new interface standard arising in the future. Non-limiting interface examples of device specific interface standards my include Small Computer System Interface ("SCSI"), Universal Serial Bus ("USB"), Firewire, Fiber Channel, Enhanced Integrated Drive Electronics ("EIDE"), Advanced Technology Attachment ("ATA"), Serial Advanced Technology Attachment ("SATA") and the like.

On the peripheral side of the device specific interface 20, the peripheral subsystem 30 may have an embedded processor 31 to receive commands from the host operating system 10 and employ hardware associated with the peripheral 33. A cache memory 32 may provide a limited amount of operating memory to facilitate the operation of the peripheral device 33 as required by the embedded processor 31. Because each conventional peripheral 33 communicates with the host operating system 10 over the peripheral's own unique interface 20, the host operating system must unnecessarily contain and execute a plurality of disparate drivers 12 and file systems 11 including operating instructions in order to operate all of the attached peripherals. Requiring the host operating system 10 to attend to the resulting file housekeeping and peripheral management tasks unnecessarily burdens the host operating system 10.

Figure 3:
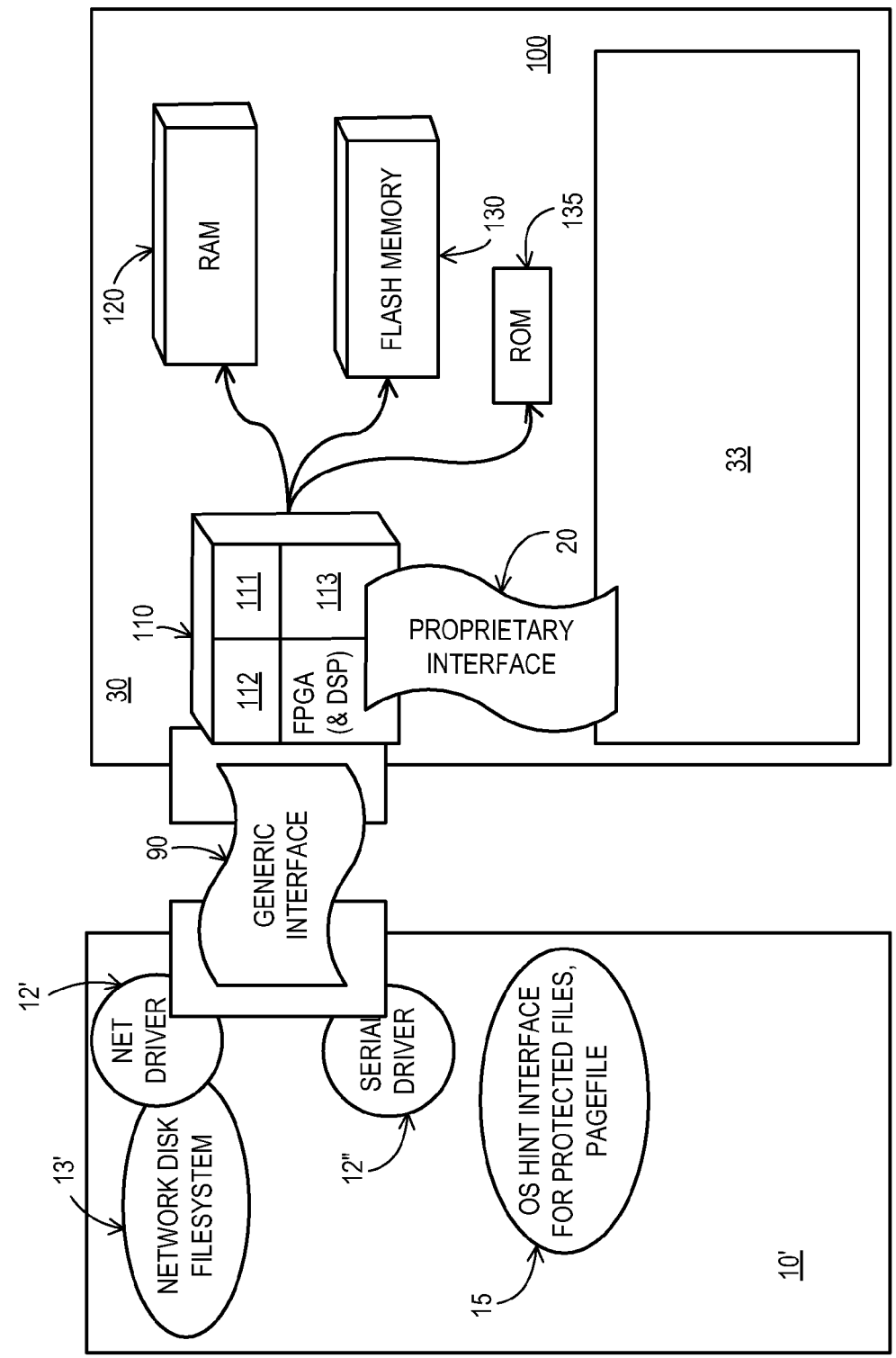
FIG. 3 depicts a peripheral subsystem utilizing a programmable logic device.

FIG. 3 is a depiction of embodiments consistent with the disclosure herein that assist in allowing a host operating system 10' to be unburdened from file housekeeping and peripheral management tasks. A PLD, such as a FPGA 110, may be integrated into the peripheral subsystem 30. The FPGA 110 may be mechanically attached to the peripheral subsystem 30 or may be configured as a stand alone component, electrically connected to the peripheral 33 by the device specific interface 20. The peripheral device 33 may be any type of peripheral. As a non-limiting example, the peripheral device 33 may be a magnetic disk drive.

A generic interface 90 may displace the device specific interface 20 formerly communicating between the peripheral subsystem 30 and the host operating system 10. The generic interface 90 may be a serial and/or a network interface. The interface 90 may be a generic/standardized high speed internet protocol ("IP") interface. The interface 90 may be a virtual interface that provides both a virtual network interface and a virtual serial interface with the host operating system 10'. A non-limiting example of such a virtual interface is described more fully in the co-owned, co-pending application Ser. No. 11/408,766 entitled "Peripheral Hardware Devices Providing Multiple Interfaces and Related Systems and Methods" and is herein incorporated by reference in its entirety.

According to some embodiments, the electronics of the generic interface 90 may be configured to emulate a plurality of interface standards for communication between the peripheral subsystem 30 and the operating system 10' using standard device drivers (12', 12"). For example the electronics of the generic interface 90 may be configured to appear to the operating system 10' as a virtual Ethernet or serial card. A command interface can thus be provided using a virtual serial interface within the electronics of the generic interface 90 and a functional interface can be provided using a virtual network interface also within the electronics of the generic electronics interface 90.

The FPGA 110, being reprogrammable in real time, may contain an auxiliary program/operating system 111 and/or a copy of a portion of the operating system 10' that may be required to operate and maintain the peripheral device 33. The FPGA 110 may further include digital signal processing ("DSP") system software 112. The DSP software 112 allows the FPGA 110 to communicate via any device specific protocol that may be required by the peripheral device 33. The FPGA 110 may also include a meta-behavior interpreter 113 which is a rules engine that may translate or augment file instructions received from the host operating system 10' over generic interface 90. The device specific interface 20, in turn, may be relocated into the peripheral subsystem 30, either mechanically, electrically or both. Because the FPGA 110 contains controlling software 111/112/113 for the peripheral device 33, the FPGA 110 may autonomously control the peripheral device 33 and relieve the host operating system 10' of that burden by operating and maintaining the peripheral 33 in the background. A non-limiting example of the peripheral subsystem 30 is further described in detail in the co-owned, co-pending U.S. Patent Application 2006/0036786 A1 which is incorporated herein in its entirety. As such, the peripheral subsystem 30 appears to the host operating system 10' as a network file system within the host computing device 1 where entire files may be requested instead of the host operating system 10' having to directly control the peripheral device 33 and then read and write blocks of data to compile a file. It should be noted that the host operating system 10' may now be rationalized or slimmed down relative to the operating system's previous size and complexity.

Because the auxiliary operating system 111 required to operate the peripheral device 33 is programmed into the FPGA 110, the host operating system 10' may now communicate with the peripheral subsystem 30 using the generic serial driver 12" (for a internal physical device) or the generic network driver 12' (for a network or virtual device) via the generic interface 90. The auxiliary operating system 111 may autonomously communicate with and control the peripheral device 33 via the device specific interface 20 (i.e., SCSI, ATA, SATA, Firewire, Fiber Channel etc.). According to exemplary embodiments, the device specific interface 20 is invisible to the host operating system 10'. Any device specific communication protocols that may be used to control the peripheral 33 over the device specific interface 20 may be translated to the common network protocol 12'/12" with which to communicate with the host operating system 10'.

The peripheral subsystem 30 may include one or more memory devices such as a read-only memory ("ROM") 135, a random access memory ("RAM") 120 and/or a flash memory 130 to provide operational flexibility such as working space and a disposable cache to facilitate the fast storage and retrieval of block maps. The memory device 120, 130, 135 may be comprised of any number or types of memory devices that conform to a manufacturer's requirements. Examples of memory devices include magnetic disks, optical disks, flash memory, memory sticks and RAM. The memory may be volatile or non-volatile or a combination thereof. RAM may be any type of RAM currently existing or developed in the future. Non-limiting examples of RAM may include Ferroelectric RAM, Magnetoresistive RAM, Phase-change RAM, Semiconductor-Oxide-Nitride-Oxide-semiconductor memory, Resistance RAM, Nano-RAM, Dynamic RAM ("DRAM"), embedded DRAM, Static RAM ("SRAM"), 1T-SRAM from Monolithic System Technology, Inc., Zero capacitor RAM and Twin Transistor RAM. A ROM may be any type of ROM currently existing or developed in the future. Non-limiting examples of ROM may include Programmable ROM ("PROM"), Erasable PROM ("EPROM"), and Electronically EPROM ("EEPROM").

In FIG. 3, the peripheral device 33 is depicted as a generic box. Consistent with the disclosure herein, the peripheral device 33 may be any type of real or virtual device. Non-limiting examples of the peripheral device 33 may be a memory device, a disk drive, an I/O device, a network interface card, a game controller and the like. Each peripheral device 33, regardless of its function, may communicate with the host operating system 10' over the generic interface 90 via the generic serial 12" and/or network driver 12'. By incorporating an auxiliary operating system 111 associated with each particular peripheral device 33 within each FPGA 110, the host operating system 10' is unburdened from having to perform routine housekeeping operations thereby increasing the host operating system's operational efficiency and speed for more critical tasks. The FPGA 110 essentially exposes the peripheral device 33 to the host operating system 10' as a simple network file system while the auxiliary operating system 111 programmed into the FPGA 110 manages the physical storage of the data, the DSP 112 manages the device specific interface protocol, and the meta-behavior interpreter 113 interprets and augments any instructions or "suggestions" received from the host operating system 10'.

Through the generic interface 90, disparate peripheral subsystems, such as the peripheral subsystem 30, operating under disparate communication protocols may communicate with the host operating system 10' using a single standard protocol, such as the standardized protocol 12'/12". In addition to the standardized protocol 12'/12", the host operating system 10' may also communicate with an additional meta-behavior interface 15 controlled by the auxiliary operating system 111. According to exemplary embodiments, the meta-behavior interface 15 communicates additional data handling instructions to the FPGA 110. The meta-behavior interface 15 may provide an additional layer of control for the peripheral subsystem 30 and may direct the FPGA 110 on file behavior in addition to controlling file attributes which may be ignored or countermanded by the user application. For example, if the meta-behavior interface 15 is told by the host operating system 10' that "this is a 'read-only' file", then the meta-behavior interpreter 113 may revise and reinforce the 'read only' status such that the only an appropriate revocation command communicated through the same meta-data interface will unlock it. According to exemplary embodiments, the meta-behavior interface 15 is used to manipulate file and file system behavior that cannot or should not be manipulated by the host operating system 10'. Without the meta-behavior interface 15 and/or meta-behavior interpreter 113, the filing system controlled by the FPGA 110 may collapse into what may appear to the host operating system 10' as a traditional network file system. From the meta-behavior interface 15 and from inference based on usage, file name, location and the like, files may be more flexibly processed. As non-limiting examples, the meta-behavior interface 15 may identify files as protected files, designate disk space as a pagefile, identify file checkpoints and rollbacks, direct file locations on physical disks, and the like. The meta-behavior interpreter 113 may translate, augment, amplify and/or modify the processing requested by the host operating system 10'.

Once transferred to the peripheral subsystem 30 via the generic interface 90, the FPGA 110 decides how to store or process files based on usage and any special handling input via the meta-behavior interface 15. As non-limiting examples, the FPGA 110 may decide how to store files on a hard disk. Pagefiles may be located on the fastest part of the disk, read only files may be compressed, read/write files may be disbursed across the disk and then logically mapped. High use files, such as directory entries, may be cached into the flash memory 130 or the RAM 120. Disk compression and mapping may also be accomplished by the FPGA 110. As such, disk maintenance functions may be carried on in the background without the host operating system 10' being involved and variable speed disks may slow down and speed up as required without operating system intervention.

The FPGA 110 incorporated in a particular peripheral subsystem, such as the peripheral subsystem 30, may be programmed in a number of ways. The FPGA 110 may be preprogrammed by the manufacturer such that the auxiliary operating system 111 required to operate the peripheral device 33 is contained in the flash memory 130 and flashes the FPGA upon boot up. As a non-limiting example, the auxiliary operating system 111 may be a custom file system and which may also contain a custom device driver for the peripheral device 33. Any number of non-volatile memory devices may be used for this function.

Alternatively, the flash memory 130 may cause the FPGA 110 to request or draw the required programming from the host operating system 10' upon boot up using a bin loader program, or the required programming may be obtained through a combination of a draw from the operating system 10', a programming from the flash memory 130 and/or a programming draw from a network based storage device. A manufacturer may also include other means for programming the FPGA 110 such as including the read only memory 135 or other device that meets a particular manufacturer's requirement.

Figure 4:
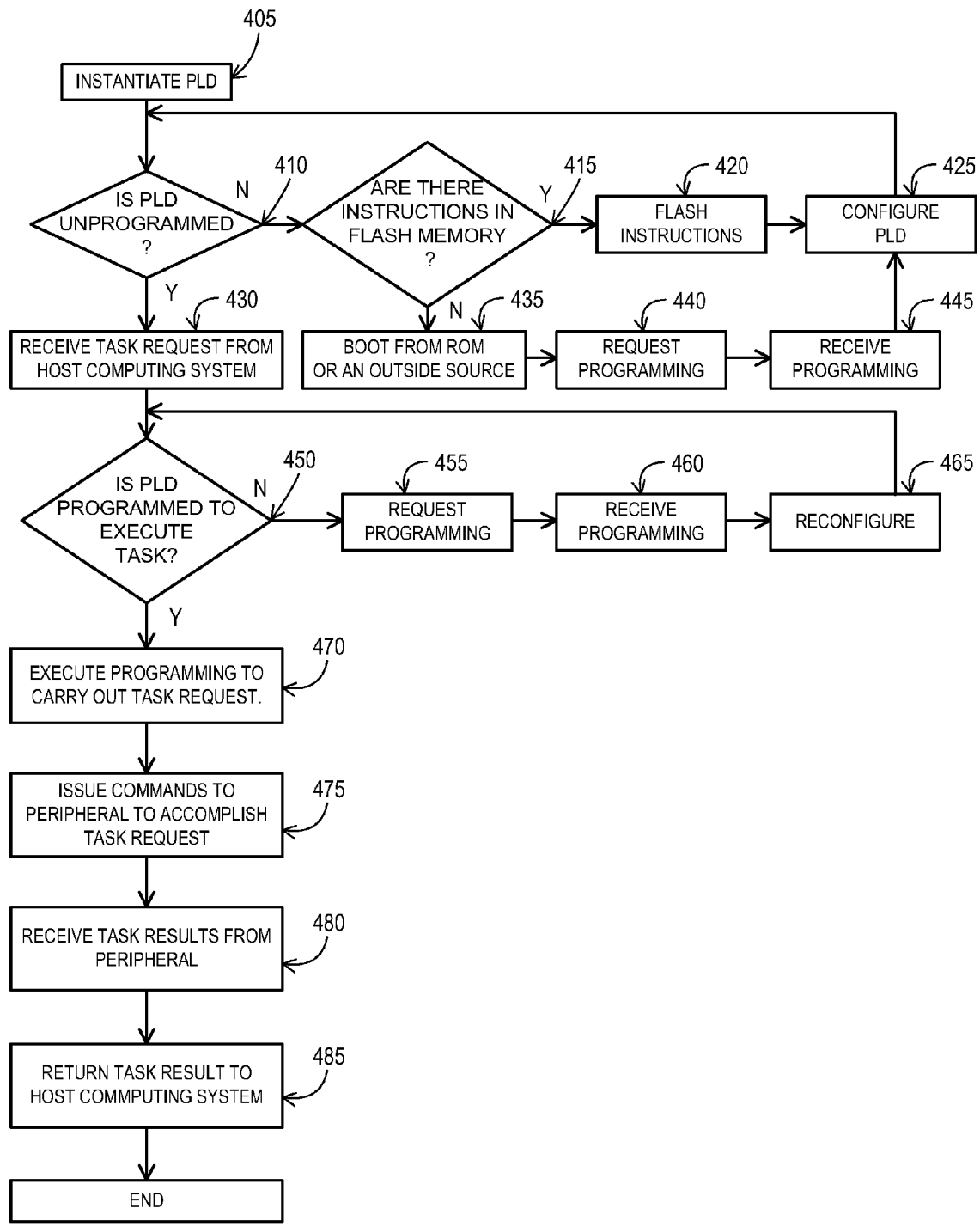
FIG. 4 is an exemplary flow chart demonstrating a process using a programmable logic device in conjunction with a peripheral device.

FIG. 4 is a flow chart illustrating a method for distributed computing using a PLD, such as the FPGA 110, as described above. At process 405, the PLD 110 within the peripheral subsystem 30 is instantiated. The instantiation may be required because the computing system is undergoing a normal power up or because the peripheral subsystem 30 has been newly installed within the computer system or because the PLD 110 requests a new instantiation. Once instantiated, the PLD 110, the host computing system 10', the flash memory 130 and/or the ROM 135 may determine if the PLD 110 has been programmed for operation at process 410.

Programming the PLD 110 for operation may include receiving the auxiliary operating system 111 or merely receiving sufficient instructions from the flash memory 130, the ROM 135, operating system 10', the RAM 120 or an internet based device 100 to allow a level of functionality with operating system 10'. Because the PLD 110 may be reprogrammed in real time, the PLD programming may change from time to time or may change in an iterative fashion. The PLD 110 may be determined to be unprogrammed/misprogrammed via a feedback response through the meta-behavior interface 15 to the operating system 10'. The PLD 110 may be determined to be unprogrammed/misprogrammed by a signal sent to the flash memory 130, the RAM 120 and/or a message sent to an internet based device 100. Such feedback may include a negative response, a positive response and may be sent on demand and/or asynchronously. For example, every tasking request from the operating system 10' may have a complementary response with positive and/or negative results and may also include any additional information that may result in the proper programming being located and provided. Such feedback may also be accomplished by running a daemon on the meta-behavior interface 15 such that asynchronous messages from the PLD 110 may result in real-time behavior modification of operating system 10'. Further, the PLD 110 may have multiple "personalities" each of which are stored within the flash memory 130, for example, that may be loaded and unloaded from PLD 110 to satisfy a particular tasking request.

If the PLD 110 is determined to be unprogrammed for a specific tasking, a further determination is made as to whether the flash memory 130 exists in communication with the PLD 110 and whether the flash memory 130 contains the needed instructions at process 415. If the flash memory 130 contains the instructions for the PLD 110, then the flash memory 130 flashes the PLD 110 at process 420. If instructions in the flash memory 130 are determined not to exist at process 415, then a decision is made to boot from an out side source at process 435 and instructions from an outside source are requested at process 440. Such sources may be the ROM 135, the host operating system 10', an internet device or from a combination thereof. At process 445, the PLD 110 receives programming from the outside source. Such programming may be the auxiliary operating system 111.

Once the PLD 110 receives programming, the PLD is configured according to the programming received at process 425 and is thereby ready for operation in conjunction with the host operating system 10'. Once configured, the PLD 110 may receive a task request from the host operating system 10' for the peripheral device 33 via the generic interface 90 at process 430. It may be the case that the PLD 110 is determined not to be properly programmed to execute the specific task required at decision point 450. If the PLD 110 is not properly programmed, then the PLD 110 requests the required programming from an outside source at process 455. At process 460, the proper programming is received from an outside source. The PLD 110 is reconfigured at process 465. Once properly configured, the PLD 110 executes associated programming to carry out the task request at process 470. Based on the task request, the PLD 110 issues one or more commands to the peripheral device 33 to accomplish the task request over the device specific interface 20. Once the task is completed by the peripheral device 33, the PLD 110 receives the task results from the peripheral device 33 at process 480, reformats the task results if necessary and forwards the results to the host operating system 10' via the generic interface 90 at process 485.

Returning to FIG. 3, other exemplary embodiments consistent with this disclosure may include an optical disk implementation where the peripheral subsystem 30 may be an optical disk reader as the peripheral device 33 instead of a magnetic disk. Non-limiting examples of optical disk drives include CDs, DVDs, Blue-ray, HD DVDs, Holographic DVD's, Enhanced DVDs and paper disk drives from Sony Corporation. Future optical disk drive designs are also contemplated as falling within the bounds of the disclosure herein. Again, the generic interface 90 exposes the peripheral subsystem 30 to the host operating system 10' as being a network file system. The optical disk peripheral subsystem 30 may be programmed in the same manner as discussed above for a magnetic hard drive. The FPGA 110 may read and compress all or critical parts of the optical disk data automatically into the flash memory 130 or RAM 120. After reading, the FPGA 110 may then spin down the optical disk and then operate off of the memory 120/130 thus saving power, heat and increasing performance. Further, once spun down, the optical disk may then be removed. The data from the optical disk may then be run off of the memory 120/130 until another disk is installed. If the disk is reinserted, any disk signature data may be compared with the stored data on the memory 120/130, and if there is a match, the memory copy may be used again.

Further, drive specific, copyright security may be implemented through the use of the subject matter described herein. For example, as the information is copied from the optical disk, a data string may be copied to the optical disk such that the optical disk may become non-functional in a drive other than the one in which the optical disk was created or had a digital relationship. Other more sophisticated DRM methods may include a contact scrambling method or a payment gateway.

According to exemplary embodiments, in order to write to the optical disk 33, the RAM 120 and flash memory 130 may be used by the FPGA 110 to build the data to be stored on the optical disk 33. From the perspective of the host operating system 10', the peripheral subsystem 30 appears to be an ordinary read/write file system. When the host operating system 10' issues a command to commit or burn via the generic interface 90, then the peripheral subsystem 30 may begin transferring the data from the memory 120/130 to the optical disc reader/writer 33. The files in memory 120/130 may become read-only while the burn is in progress but may still be readable by the host operating system 10'. Further, as information is burned to the optical disk 33, a data string may be copied to the optical disk creating a relationship between the disk and the peripheral subsystem 30 such that the optical disk may become non-functional in a drive other than the one in which the disk was created or had a digital relationship.

Other exemplary embodiments consistent with this disclosure may include removable solid state disk (i.e., a SanDisk) implementation where the peripheral device 33 of the peripheral subsystem 30 includes solid state removable storage media. Non-limiting examples of such media include compact flash memory, a memory stick, a USB pen drive or a thumb drive. Future developments in removable media are contemplated as falling within the disclosure herein as may be required to fill a manufacturer's requirements. The data from the removable media 33 may be compressed if necessary and transferred to the memory 120/130. The host operating system 10' may then access the transferred data directly from the memory 120/130 which may be faster than from the removable disk 33 and also reduce the amount of read/write fatigue on the removable solid state disk 33. The data from the solid state disk 33 may then be run off of the memory 120/130 until another removable disk is installed. If the disk is reinserted the disk's signature data may be compared with the stored data, and if there is a match, the memory copy is used again. In addition, drive specific DRM may be implemented through the use of the subject matter described above.

Similarly, a PLD such as the FPGA 110 may also be used in other embodiments including a logical disk implementation wherein the peripheral device 33 of the peripheral subsystem 30 may include a network interface. In doing so, a network based filing system may be presented to the operating system 10' as the front end of another local file system accessible by a generic driver such as the network driver 12'. In such an arrangement, information from the remote network file system may be locally cached in the RAM 120 or flash memory 130 thereby facilitating faster transfer of large files to and from the host operating system 10' over the generic interface 90. Further, meta-behavior hints and other information processing rules from the host operating system 10' may be applied in the normal course via the meta-behavior interface 15.

A logical disk configuration may also be used to retrofit legacy computers to operate with a smart memory device such as the PLD 110. A device interface, such as the device interface 20, using a protocol such as EIDE, SCSI, USB, FireWire or other protocol may be placed in communication with the generic interface 90 via the PLD 110. The device interface 20 may simulate the physical characteristics of a physical memory device. However, tasking requests from host operating system 10' may be forwarded by the PLD 110 to a network device in a manner similar to the internet SCSI ("iSCSI") protocol except that any requests from the operating system 10' would be actually directed to a file in network storage rather than an internal memory device 33. Such a configuration may provide a means for the operating system 10' of a legacy device to upload the required network and serial drivers 12 to task the PLD 110. Access to and control of an internet based disk system may be accomplished by translating and augmenting instructions from operating system 10' by the meta-behavior interface 15 and meta-behavior interpreter 113 as discussed above.

A PLD 110 (e.g. an FPGA) may also be applied as a port replicator where traditional interface hardware required by a host computer system may be virtually created since the actual hardware implementation is divorced from the host operating system. As such, traditional hardware and ports allowing keyboard, video, mouse and KVM switch operability may be replaced with standardized FPGA modules programmed or reprogrammed to accomplish the same functions. As such, motherboards may be simplified and miniaturized. For example, instead of installing a number of controller and other single purpose interface cards, a motherboard may now contain a number of generic ports that may accept a standardized FPGA subsystem/module, such as the FPGA 110. As a non-limiting example, if the host system's purpose is mainly a server that does not require a keyboard connection or a video connection, any FPGAs programmed to carry out those functions may be reprogrammed in place to carry out other functions or may be removed from the motherboard entirely, thereby achieving the desired configuration with a standardized motherboard and no additional hardware. Also, desired functions (i.e., a keyboard) may be relocated to another computing device in a network whereby the server may be accessed through a network interface coupled to the FPGA module 110 without the host operating system 10' noticing a difference.

It may also be appreciated that multiple FPGAs may be used in conjunction with each other as peers to maximize the efficient use of peripherals. This cooperative use of multiple FPGAs may be referred to as "ganging". Ganging may be conducted between any number of PLDs as may be desired by the system designer to accomplish a particular functionality. The host operating system 10' is not directly involved in this operation and may not be aware that ganging is even occurring.

Figure 5:
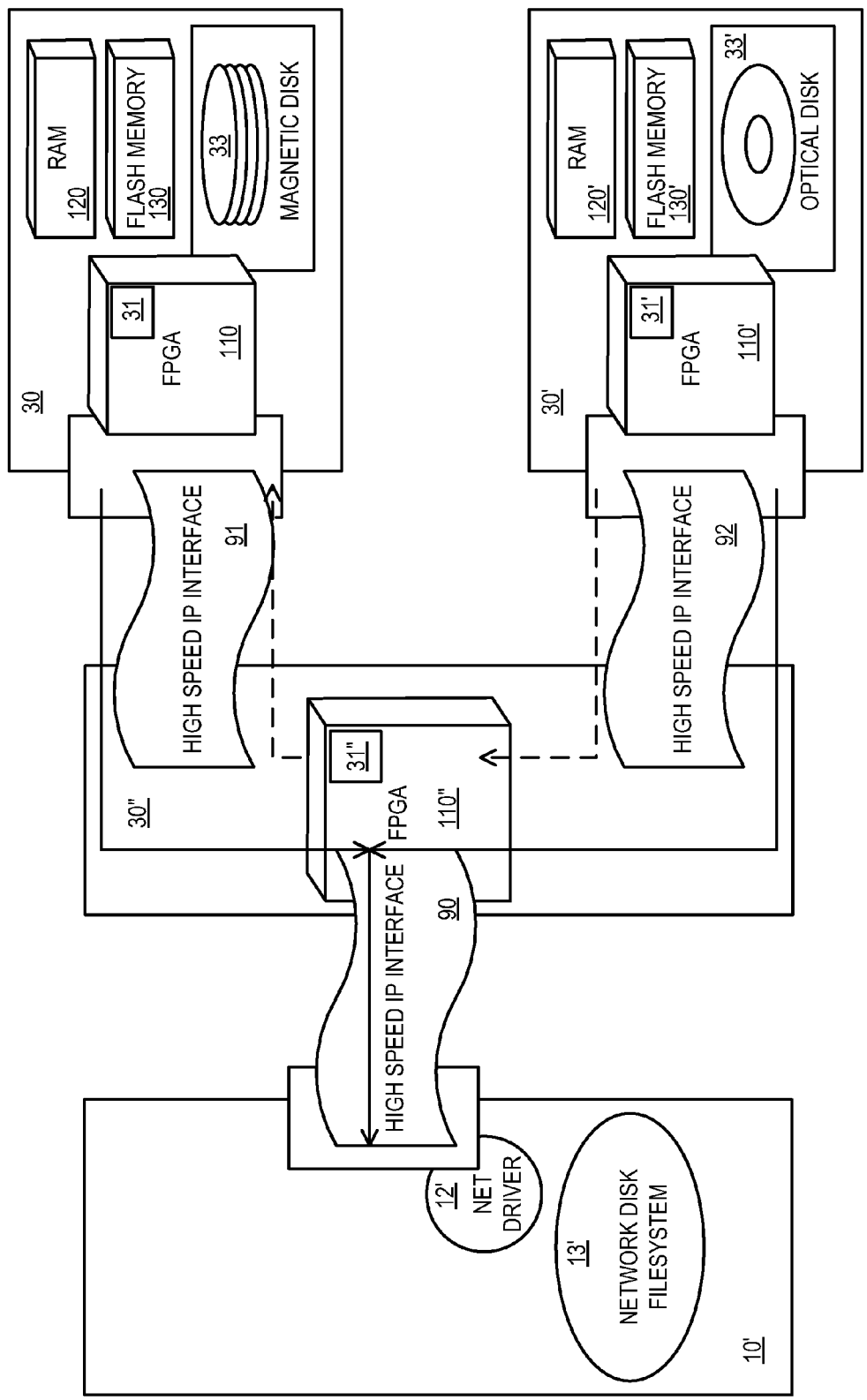
FIG. 5 illustrates the "ganging" of peripheral subsystems incorporating programmable logic devices.

FIG. 5 illustrates a non-limiting example of ganging using only three FPGAs for the sake of simplicity. A peripheral subsystem 30' in this example contains an optical disk drive 33' controlled by an FPGA 110'. Assuming that the optical disk drive 33' contains a disk with data that surpasses the capacity of a flash memory 130' and a RAM 120', it would be advantageous for the FPGA 110' to be able to locate spare storage capacity elsewhere which would allow the FPGA to deliver all of the data resident on the optical disk to host operating system 10' and thereafter spin down the optical disk drive 33'.

In this case, the memory device 33 may have spare memory available. The memory device 33 may be integral to the peripheral subsystem 30 and may be controlled by the FPGA 110. The memory device 33 in this case may be a magnetic disk. The FPGAs 110 and 110' may be in communication with an FPGA 110" via generic interfaces 91 and 92. Among other functions the FPGA 110" may be programmed to monitor and control the efficient use of memory space between the peripheral subsystem's 30 and 30'. If the FPGA 110" is not programmed to carry out that function, the FPGA 110" may be reprogrammed to carry out that function in real time.

Continuing with the example, having insufficient memory space within the peripheral subsystem 30', the FPGA 110' may query the FPGA 110" for available space. The FPGA 110" may in turn query other peripheral subsystems, such as the peripheral subsystem 30, for available memory and may locate such space on the memory device 33 by querying the FPGA 110. When the additional space is located, the FPGA 110" may signal the FPGA 110' to transmit overflow data from the peripheral subsystem 30' to the peripheral subsystem 30. The FPGA 110 may then decide to store the information into the RAM 120, the flash memory 130, the memory device 33 or a combination thereof. The data transfer (X) between peripheral subsystems may be accomplished via the generic high speed interfaces 91 and 92. One or all of the FPGA 110, 110' or 110" may retain a file system record as to the location of the data transferred.

At some point, the host operating system 10' may require the data uploaded from the optical disk which may or may not physically remain in the optical disk drive 33'. The FPGA 110" may receive the data request from the host operating system 10' via the generic high speed interface 90. The FPGA 110" may, in turn request and coordinate the simultaneous delivery of the data from the memory devices 120, 120', 130, 130' and 33. The FPGA 110" may also request data from the optical disk in disk drive 33', if necessary. The requested data may be transmitted (Y) simultaneously by the FPGAs 110 and 110' over the generic high speed interfaces 91 and 92. The requested data may be coordinated and processed by the FPGA 110" and then forwarded (Z) to the host operating system 10' via the generic high speed interface 90. From the point of view of the host operating system 10', the host operation system has merely used a standardized serial or a net driver or both to request certain information from a file system represented by the FPGA 110". The entire retrieval and coordination process, including disk management, would have been accomplished by the cooperation of the FPGAs 110, 110' and 110" without the host operating system 10' being aware of the process. Therefore, by ganging multiple FPGAs, such as the FPGAs 110, 110' and 110", together, performance may be enhanced by caching information on another peripheral subsystem's spare capacity and may respond to I/O requests as an integrated gang instead of several individual peripheral devices.

Ganging multiple FPGAs as peers may also be used to emulate the functionality of redundant arrays of inexpensive devices ("RAID"). RAID refers to a data storage scheme using multiple memory devices to share or replicate data among the devices thereby improving data integrity, fault tolerance, and capacity. Conventionally, a RAID system usually requires a special purpose RAID controller or host operating software to mirror memory devices which, consistent with the discloser herein, may also be emulated by an FPGA, such as the FPGA 110. Unlike a conventional RAID scheme, a ganging method may allow asymmetric mirroring and checksum verification of individual files stored on individual, distributed FPGAs and not just on whole file systems.

PLDs such as the FPGA 110 may also be used to implement and facilitate the operation of an antivirus application in a host computer system, such as the host operating system 10'. Conventionally, the use of antivirus software requires file processing by the host operating system 10' and the host CPU 2 in order to scan a memory device for viruses or to download and install antivirus updates. Such processing utilizes the host CPU 2 computing capacity and intrudes upon the user's awareness and computing experience. By incorporating the pertinent software objects (i.e., an antivirus engine) from the user's antivirus application into an FPGA (110, 110', 110"), the FPGA may run antivirus operations on their own peripheral devices (33, 33', 33") in the background without impinging on the host system operating system or CPU at all.

Figure 6:
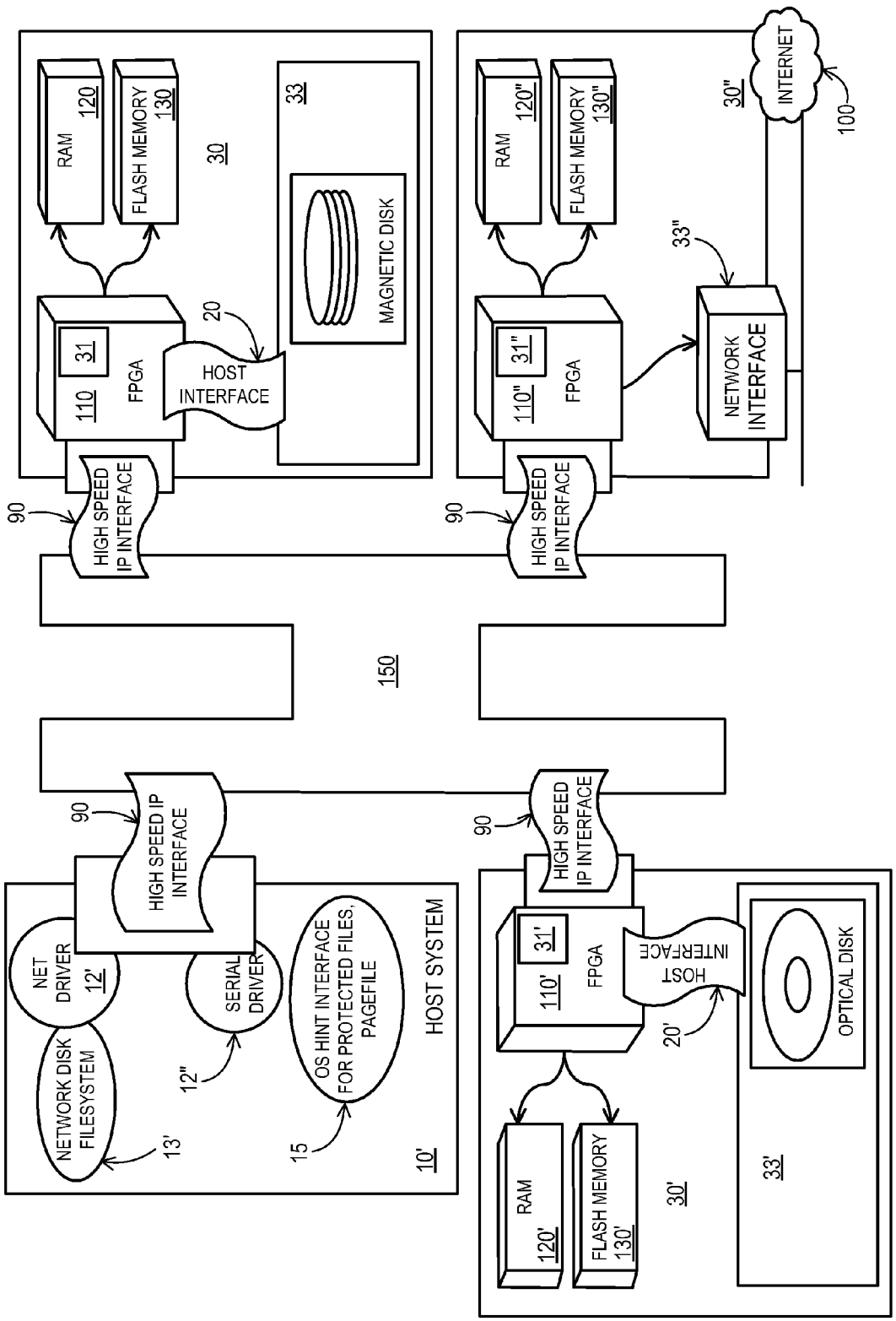
FIG. 6 illustrates multiple peripheral subsystems integrated via a motherboard.

Referring to FIG. 6, as a non-limiting example the FPGAs (110, 110', 110") may each contain an antivirus engine (35, 35', 35") sufficient to scan, update and protect the FPGAs' respective peripheral devices (33, 33', 33") to which it is associated. For instance, the FPGA 110 may be able to update antivirus definitions associated with the FPGA and scan magnetic disk 33 without the host operating system 10' being involved at all, thereby increasing the speed, efficiency and efficacy of the antivirus application as well as improve the physical operation of the peripheral device 33 and host operating system 10'. Antivirus definitions may also be hidden on the physical FPGA media where the host operating system 10' may not access them. Further, the antivirus engine 31 of the FPGA 110 may autonomously quarantine data files that appear to have malicious code. The FPGA 110 may also perform other antivirus functions such as journaling critical files for protection, rolling those files back when required, and scheduling files for virus scan or reading, writing or in background.

Other FPGAs may also contain the antivirus engines for other peripherals or network interfaces that may operate in the same fashion. As another non-limiting example, the FPGA 110' may protect the host operating system 10' from malicious software on the optical drive 33'. Upon the detection of a virus from the optical device 33', the virus may be blocked from leaving the optical device. Similarly, the FPGA 110" may also be used in conjunction with the network interface 33". The antivirus engine 31" may monitor incoming and outgoing file transfers over a network 100 such as the internet. A contaminated data stream may be isolated and either repaired or closed to prevent contamination.

Further, ganging methods as discussed above may be used to allow virus definitions to be stored on the magnetic disk 33 for use by the FPGA 110' and 110". Ganging methods may also allow additional antivirus by a defense-in-depth strategy. Referring once again to FIG. 5, each FPGA (110, 110', 110") may again have an anti virus routine (31, 31', 31") programmed. Should the FPGA 110' detect malicious software objects being loaded from the optical disk 33', the FPGA 110' may take initial steps to expunge the threat, quarantine the malicious software objects within the peripheral subsystem 30', or if the FPGA 110' can not effectively take action, then the FPGA may signal the other FPGAs with which it is in communications, such as the FPGAs 110, 110", about the threat to allow those other FPGAs to protect the peripheral subsystems 30, 30" associated with the FPGAs and the host computing system 10'.

Figure 7:
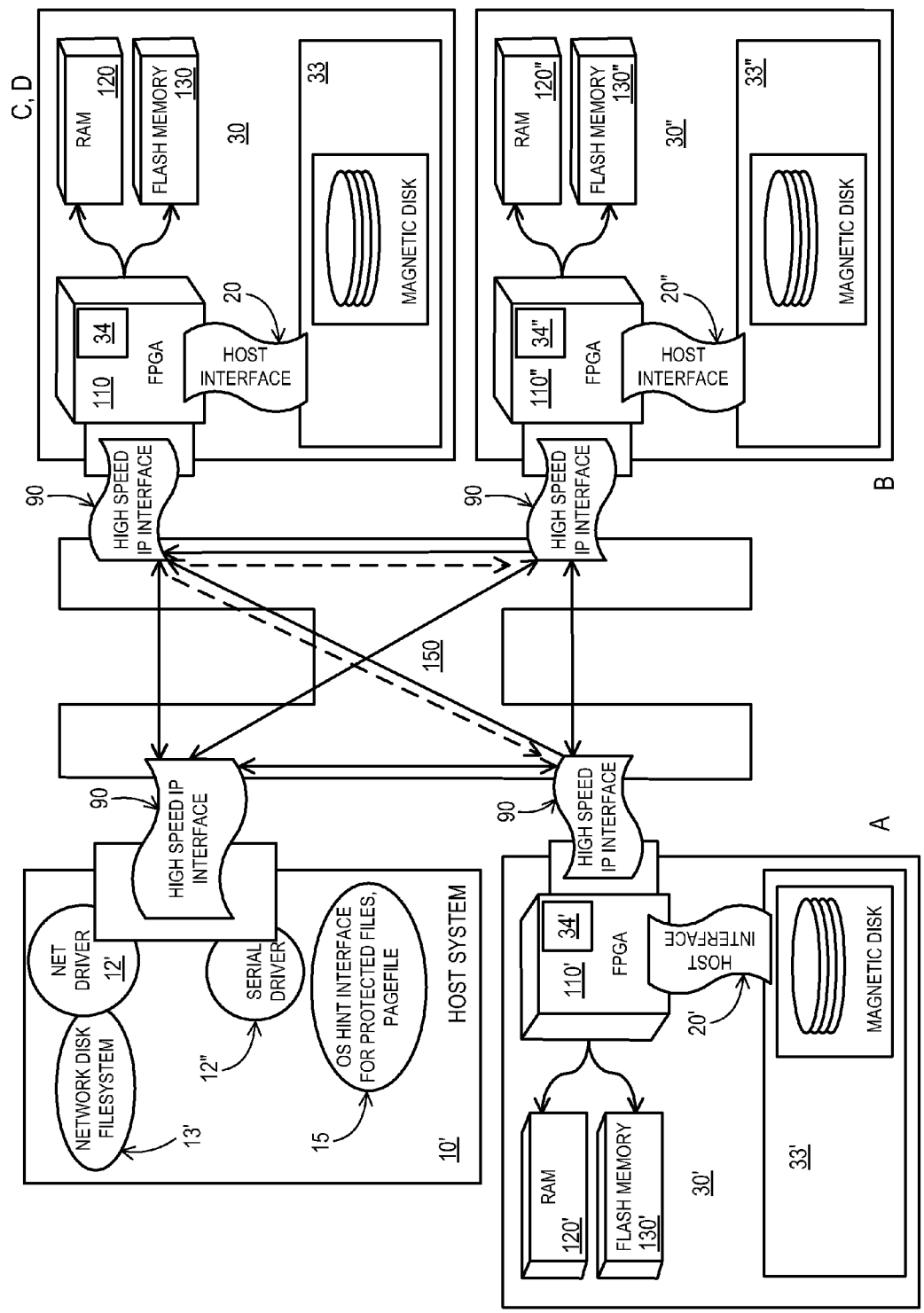
FIG. 7 illustrates the multiple levels of security using peripheral subsystems integrating programmable logic devices.

PLDs may be used to provide a secured computing environment whereby data may be securely accessed and stored at any number of levels as may be desired to fulfill a specific design goal. For the sake of simplicity, two levels of data security will be discussed for securing data amongst several memory storage devices on a system level and protecting documents on an application level. FIG. 7 illustrates a non-limiting, exemplary computing environment comprising the host computing system 10' in addition to other components which may also contain the net driver 12', the serial driver 12", the file system 13' and the set of meta-behavior instructions or operating instructions 15. The host computing system 10' may be in communication with a system device 150 via a standardized high speed IP interface, such as the interface 90. The system device 150 may be, but is not limited to, a communication bus, Ethernet cable, hub, switch, or motherboard. Also attached to the motherboard by the standardized high speed IP interface 90 may be the multiple peripheral subsystems (30, 30', 30"). The peripheral subsystems (30, 30', 30") may be any types of peripherals. However, the exemplary peripheral subsystems 30, 30', 30" in FIG. 6 are all depicted as magnetic disk storage devices installed on a single computing system belonging to users A, B, C and D. For the sake of the example each peripheral subsystem 30, 30', 30" is depicted as being attached to the common bus/motherboard 150 but may optionally be connected via a network in a distributed computing environment wherein each peripheral subsystem may exist on a remote computing device connected to the others via a network and network interface.

According to some embodiments, each PLD, such as the FPGA 110, 110', 110" residing within a peripheral subsystem within a computing environment may contain and execute security software objects (34, 34', 34") at a system level that may establish and maintain a secure relationship with the host system component 150 to which it is physically attached. At a user level each FPGA (110, 110', 110") may maintain a secure relationship with each of the other FPGAs and the host system 10'. As discussed above, the security software objects 34, 34', 34" may be preprogrammed into the peripheral subsystems 30, 30', 30" by the peripheral manufacturer, or the security software objects may be drawn from the host system operating system 10'.

At a system level, each FPGA (110, 110', 110") of the peripheral subsystems 30, 30', 30" may establish a secure relationship with the system device 150 to which the FPGA is attached. Such a relationship may be manifested by establishing key value pairs, public/private keys or other cryptographically secure method that may occur to one of ordinary skill in the art. The effect of establishing such a relationship would be to allow each peripheral subsystem 30, 30', 30" to send and receive data amongst themselves freely and also prevent the operation of the peripheral subsystems in foreign operating systems should the peripheral subsystems or the media disks 33, 33', 33" from the peripheral subsystems be removed from the host computing device without authorization. Reinstalled in a foreign computing device, the peripheral subsystem 30, 30', 30" would not have a relationship with the foreign motherboard to which the peripheral subsystem is attached and thereby refuse to communicate or otherwise interact with the foreign motherboard. The peripheral subsystem 30, 30', 30" may also contain instructions to disable itself or automatically erase data if the component to which the subsystem finds itself attached is not recognized.

Should a memory device fail or have to be otherwise replaced with a new disk drive 33, the new disk drive would first need to establish a relationship with the motherboard 150. Once the relationship has been established, the new peripheral subsystem 30 may be operated and/or repopulated. Repopulation may be accomplished via a ganging configuration discussed above wherein other memory storage devices (33', 33") contain data that may have been cached or mirrored from the failed peripheral subsystem and may be reconstituted in the new peripheral subsystem. Because each PLD/FPGA 110, 110', 110" contains and executes an extract of the operating system, establishing the new relationship and the repopulation may be accomplished by the FPGAs alone with little or no burden on the on the host system CPU or operating system.

At the user or application level, each FPGA 110, 110', 110" may establish a secure relationship with other FPGAs integrated into other peripheral subsystems within the host computing device or that are devices within a distributed computing environment. Such a relationship may also be created by establishing a second scheme of key value pairs, public/private keys or other cryptographically secure method that may occur to one of ordinary skill in the art. The relationship may be manifested by designating one or more files as "shared" files. The user may designate not only which files may be "shared" but also designate with whom they will be shared. Using a family context as an example, Dad (A) may have read/write access to all memory peripherals in the computing device or on the home network. Mom (B) may not have access to Dad's (A) memory device, but both Mom and Dad have read/write access to brother and sister's memory devices (C,D). Brother (C) and sister (D) may not have any access to the other's data at all. Brother and sister may also have read only access to certain directories or files of Mom (B) and Dad's (A). Even in this relatively simple example, the combinations and permutations of access and levels of access are myriad.

It should be noted, however, that because there may be multiple, independent levels of security provided by each FPGA (110, 110', 110"), a user may not be permitted access to another user's files even though the data constituting those files may reside on spare memory capacity on his own memory device. Conversely, the user may be able to access his own files, all or some of which are stored on a memory device belonging to another. The location of the data is determined by the available capacity and the inter-relationship of the various FPGAs and may be rearranged, redistributed, scanned, compressed/decompressed, etc. in the background without the host operating system's participation or awareness.

Other embodiments consistent with the disclosure herein include the creation of multiple virtual personal computers within a single computer by accommodating multiple copies of an operating system within a host computer. Because each PLD/FPGA 110 may be programmed and nearly instantaneously reprogrammed to execute any number of subroutines, one or more FPGAs may be programmed to run an independent operating system in a window on the same computer simultaneously with the host operating system 10'. The virtual computer may have its own IP address and one or more files that are designated to act as its virtual hard disk. As such, multiple users may utilize the same computing device simultaneously. By creating a virtual computer, one may for example, maintain a "business" computer and a "gaming" computer on the same hardware. Further, since the virtual computer consists completely of software objects the entire computer may be moved from one set of computer hardware to another without having to reinstall or reconstitute the operating system and applications.

Once installed on a host set of hardware, such as the computer 1, the host operating system 10' may provide a basic set of software instructions over the meta-behavior interface 15 to control, manage and deconflict the visual display(s) such that both the actual and virtual computers may utilize screen output. Further, since the virtual computer is run on an operating system resident on a FPGA or other PLD, each of the virtual and actual computers may be isolated from each other by utilizing the multilevel secured environment programmed into each FPGA as discussed above. In that environment, user access to each computer may be prohibited while at the same time memory, processing capacity and physical hard disk space may be maximized.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. An apparatus in communication with a host computing system, the apparatus comprising:
    a generic interface, wherein the host computing system employs the apparatus via the generic interface;
    a device interface; and
    a programmable logic device ("PLD") coupled to the host computing system via the generic interface, the PLD communicating through the generic interface with the host computing system via a first file system protocol to store and to retrieve data from a peripheral device, the PLD also being coupled to the peripheral device via the device interface and communicating with the peripheral device using a second file system protocol that is foreign to the host computing system to store and to retrieve data using the peripheral on behalf of the host computing system.

2. The apparatus of claim 1, wherein the PLD includes a digital signal processor capable of implementing a plurality of device interfaces.

3. The apparatus of claim 1 wherein the generic interface is a virtual interface.

4. The apparatus of claim 3 wherein the generic interface comprises one or more virtual Ethernet interfaces and/or one or more virtual universal asynchronous receiver-transmitter (UART) interfaces.

5. A method for distributed computing for a host computing device comprising:
    receiving an instruction within a programmable logic device ("PLD") for controlling a peripheral device, the PLD being in communication with the peripheral device via a device interface and also in communication with the host computing device via a generic interface;
    receiving a task request from the host computing device via the generic interface to be accomplished according to the instruction;
    augmenting the task request with additional instructions provided by a meta-behavior interface;
    issuing one or more commands to the peripheral device via the device interface in response to the augmented task request;
    receiving a result from the peripheral device upon completion of the augmented task request; and
    returning an indication of the result to the host computing device via the generic interface.

6. The method of claim 5, wherein the instruction is a unique auxiliary program that is not under the control of the host operating system.

7. The method of claim 5, wherein the instruction includes a signal processing system.

8. The method of claim 5, wherein the peripheral device is one of a network interface, an arbitrary interface, a data storage device or a combination thereof.

9. The method of claim 5, wherein the instruction is re-instantiated from time to time and comprises a combination of both an executable language and corresponding executable commands.

10. The method of claim 5, wherein the task request is sent via one of a network driver and a serial driver.

11. The method of claim 5 wherein the peripheral device is another PLD.

12. A computer-readable medium containing an auxiliary program within a logic device in communication with a host operating system containing instructions to:
   create a data storage and a file system that are foreign to the host operating system with which to store data to and retrieve data from a peripheral device;
   receive an instruction for controlling the peripheral device, wherein the logic device is in communication with the peripheral device via a device interface and in communication with the host computing device via a generic interface;
   receive a task request from the host computing device via the generic interface;
   augment the task request with additional instructions provided by a meta-behavior interface within the auxiliary program;
   issue one or more commands to the peripheral device via the device interface in response to the augmented task request;
   receive a task result from the peripheral device upon completion of the augmented task request; and
   return an indication of the task result to the host computing device via the generic interface.

13. The computer-readable medium of claim 12, wherein the auxiliary program is foreign to the host operating system.

14. The computer-readable medium of claim 12, wherein the auxiliary program implementation includes a signal processing system.

15. The computer-readable medium of claim 12, wherein the peripheral device is one of a network interface and an arbitrary interface.

16. The computer-readable medium of claim 12, wherein the auxiliary program language implementation is reprogrammed from time to time.

17. The computer-readable medium of claim 14, wherein the task request is sent via one of a network driver and a serial driver.

18. The computer-readable medium of claim 12, wherein the logic device is a reprogrammable logic executing device.

19. The computer-readable medium of claim 18, wherein the peripheral device is a Field Programmable Gate Array.

20. The computer-readable medium of claim 12, wherein at least one of the instantiations instantiation of the auxiliary program is unique relative to all previous and all subsequent instantiations.

* * * * *